United States Patent [19]
Tsutsumi

[11] Patent Number: 5,124,630
[45] Date of Patent: Jun. 23, 1992

[54] SWITCHING POWER SUPPLY APPARATUS

[75] Inventor: Tsuyoshi Tsutsumi, Tokyo, Japan

[73] Assignee: NEC Corporation, Tokyo, Japan

[21] Appl. No.: 734,237

[22] Filed: Jul. 22, 1991

[30] Foreign Application Priority Data

Jul. 30, 1990 [JP] Japan .................................. 202072

[51] Int. Cl.[5] .............................................. G05F 1/613
[52] U.S. Cl. .................................... 323/299; 323/901; 323/902; 323/908; 363/49
[58] Field of Search ............... 323/901, 902, 908, 299, 323/289; 363/49, 50

[56] References Cited
U.S. PATENT DOCUMENTS
4,063,302 12/1977 Donig .................................... 361/90

Primary Examiner—Steven L. Stephan
Assistant Examiner—Adolf Berhane
Attorney, Agent, or Firm—Laff, Whitesel, Conte & Saret

[57] ABSTRACT

According to this invention, in a power supply circuit of a switching power supply apparatus, a circuit arrangement capable of adjusting the resistance values of a plurality of resistors in accordance with an input voltage condition is realized so that the switching power supply apparatus can be applied to a wide range of input voltages.

6 Claims, 5 Drawing Sheets

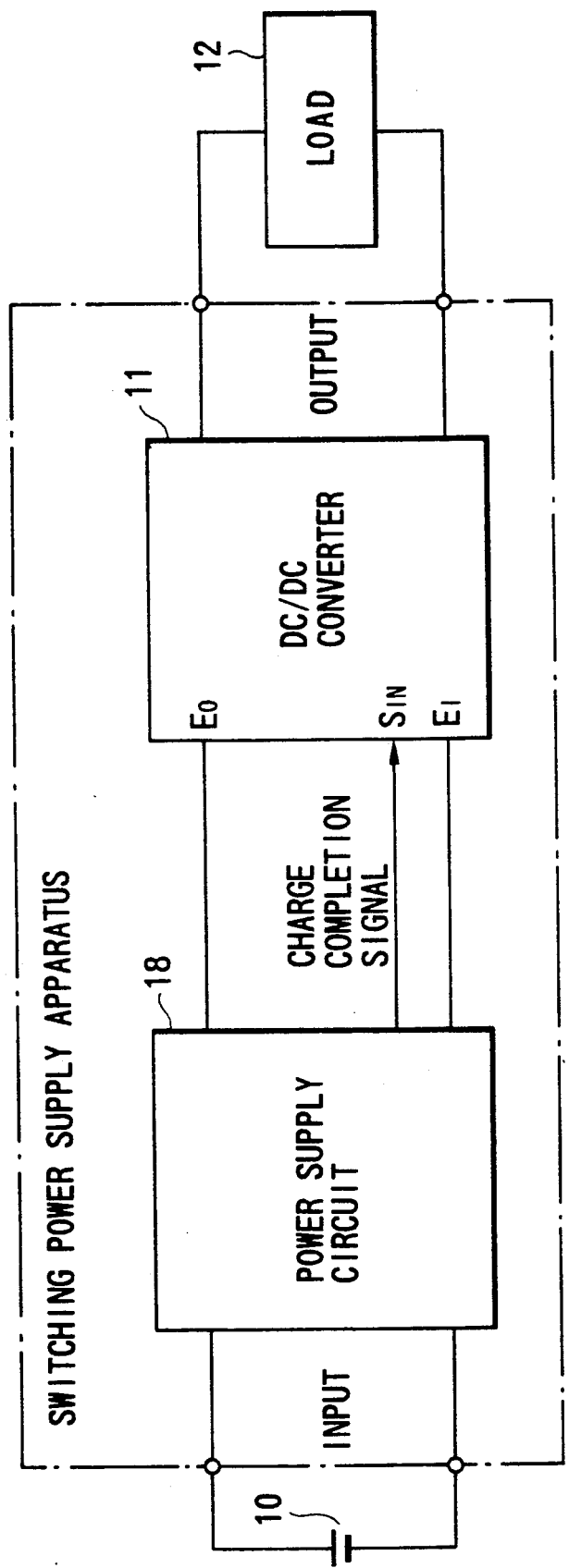
F I G. 1

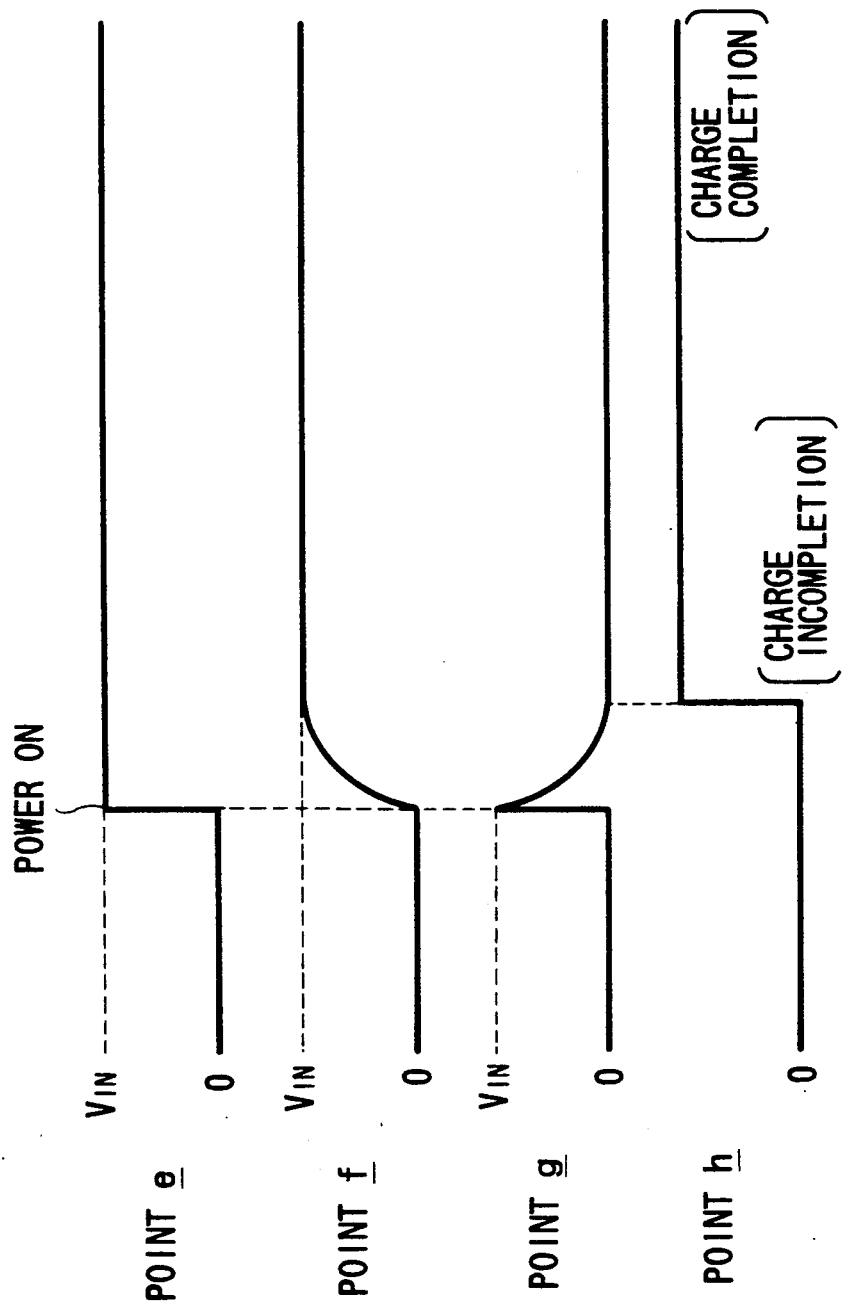

SWITCHING POWER SUPPLY APPARATUS

BACKGROUND OF THE INVENTION

The present invention relates to a switching power supply apparatus and, more particularly, to an improvement in a power supply circuit for preventing an inrush current upon supply of power to an input terminal of the switching power supply apparatus and transmitting a signal representing completion of charging of an input filter capacitor to a control section.

A conventional power supply circuit of this type used for a switching power supply apparatus has a circuit arrangement based on a relay.

A conventional circuit will be described below with reference to FIGS. 4 and 5. As shown in FIG. 4, a switching power supply apparatus is constituted by a DC/DC converter 26 and a power supply circuit 28. The power supply circuit 28 comprises resistors 13 to 18, a capacitor 19, npn transistors 20 and 21, a relay 22, and a diode 24. Reference numeral 25 denotes a DC power supply; and 27, a load. When a stepped input voltage is applied to an input terminal (point e) of the switching power supply apparatus, a voltage waveform obtained by differentiating the stepped input voltage appears at a point g in FIG. 4, as shown in FIG. 5. With this operation, since the npn transistor 21 is turned on, and the base potential of the npn transistor 20 is pulled down to the negative input, the npn transistor 20 and the relay 22 are in an OFF state. The voltage at the point g reaches its peak when the input voltage is applied, and is gradually decreased. When this voltage becomes lower than the base-emitter voltage $V_{VE}$ of the npn transistor, the npn transistor 21 is turned off, and the npn transistor 20 is turned on to drive the relay 22. As a result, the negative terminal of the capacitor 19 is connected to the negative power supply input terminal through a contact 23 of the relay 22. At the same time, a signal representing the completion of charging of the input filter capacitor is transmitted to a signal input terminal $S_{IN}$ of the DC/DC converter 26. FIG. 5 shows voltage waveforms at the point e, a point f, the point g, and a point h in a state wherein the power supply circuit shown in FIG. 4 is operated.

As described above, in the prior art, the characteristics of a power supply circuit are determined by the sensitivity voltage of a relay to be used. For this reason, in a case wherein a switching power supply has a considerably different input voltage condition, the relay must be replaced with a relay having different sensitivity voltage characteristics. In addition, if an input voltage varies in a wide range, the operation margin of a relay is reduced at the lower limit value of the input voltage, and the operation of the power supply circuit becomes unstable, resulting in poor versatility.

SUMMARY OF THE INVENTION

It is an object of the present invention to provide a switching apparatus which can be applied to a wide range of input voltages.

It is another object of the present invention to provide a switching apparatus which can stably perform a power supply operation.

It is still another object of the present invention to provide a switching apparatus which does not require any relay in a power supply circuit.

In order to achieve the above objects, according to the present invention, there is provided a switching power supply apparatus comprising a DC/DC converter, having a signal input terminal for receiving a standby completion signal, for converting an input voltage from a DC power supply and applying the converted voltage to a load, an input filter capacitor connected to between DC power supply input terminals of the DC/DC converter, a first series circuit constituted by a first resistor and a Zener diode which are connected between positive and negative electrodes of an input power supply, a second series circuit connected in parallel with the Zener diode and constituted by a photocoupler for supplying an output to the signal input terminal of the DC/DC converter and a transistor for receiving a differential output from the input filter capacitor as a base input, and a field effect transistor having an input electrode connected to a node between the DC power supply and the first series circuit, an output electrode connected to a negative input terminal of the DC/DC converter, and a control electrode connected to a node between the first resistor of the first series circuit and the Zener diode.

BRIEF DESCRIPTION OF THE DRAWINGS

FIG. 1 is a block diagram showing an arrangement of the present invention;

FIG. 5 is a timing chart showing operating waveforms at the respective portions in the conventional apparatus.

DESCRIPTION OF THE PREFERRED EMBODIMENT

Figure 2:
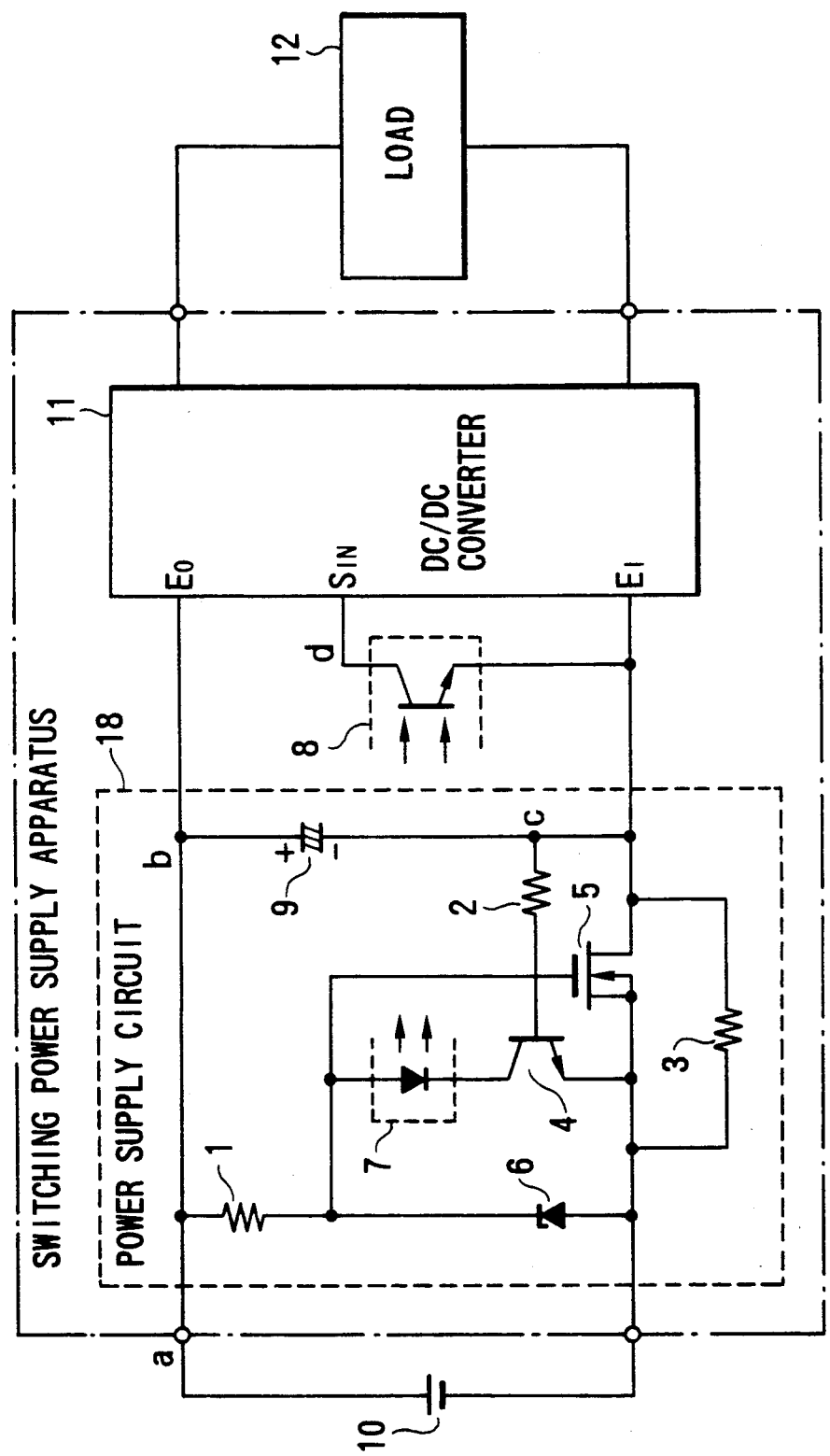
FIG. 2 is a circuit diagram showing a detailed arrangement of the embodiment of the present invention.

An embodiment of the present invention will be described below with reference to the accompanying drawings. FIGS. 1 and 2 show an arrangement of this embodiment. A power supply circuit 18 comprises resistors 1 to 3, an npn transistor 4, a field effect transistor (to be referred to as a MOSFET hereinafter) 5, a Zener diode 6, a primary element 7 of a photocoupler, and a capacitor 9. Reference numeral 10 denotes a DC power supply; 11, a DC/DC converter; and 12, a load.

As shown in FIGS. 1 and 2, the embodiment comprises the DC/DC converter 11 and the power supply circuit 18 for supplying power to the DC/DC converter 11. The power supply circuit 18 includes a capacitor 9 connected in parallel with input terminals $E_0$ and $E_1$ of the DC/DC converter 11. The DC/DC converter 11 includes a signal input terminal $S_{IN}$ for receiving a standby completion signal, i.e., a signal representing completion of charging of the capacitor 9. More specifically, the power supply circuit 18 as a characteristic feature of the present invention comprises: the first resistor 1 having one terminal connected to the positive potential terminal (the positive side of the DC power supply 10), of the power supply circuit 18, to which one electrode of the capacitor 9 is connected; a Zener diode 6 having the cathode electrode connected to the other terminal of the resistor 1, and the anode electrode connected to the negative potential terminal of the power supply circuit 18 (the load side of the DC power supply 10); a photocoupler having the anode electrode of the primary element 7 connected to the other terminal of the first resistor 1, the output electrode of a secondary element connected to the signal output terminal, and the input electrode of the secondary element 8 connected to the other electrode of the capacitor 9; the MOSFET 5 having the control electrode connected to the other terminal of the resistor 1, the input electrode connected to the load side terminal of the circuit 18, and the output electrode connected to the other electrode of the capacitor 9; the npn transistor 4 having the output electrode connected to the cathode electrode of the primary element 7 of the photocoupler, and the input electrode connected to the load potential terminal of the circuit 18; the second resistor 2 through which the control electrode of the npn transistor 4 and the other electrode of the capacitor 9 are connected to each other; and the resistor 3 which connects the input electrode of the npn transistor 4 to the output electrode of the MOSFET 5 and constitutes a loop when the MOSFET 5 is OFF. In addition, a first series circuit is constituted by the resistor 1 and the Zener diode 6, and a second series circuit is constituted by the primary element 7 of the photocoupler, and the transistor 4.

Figure 3:
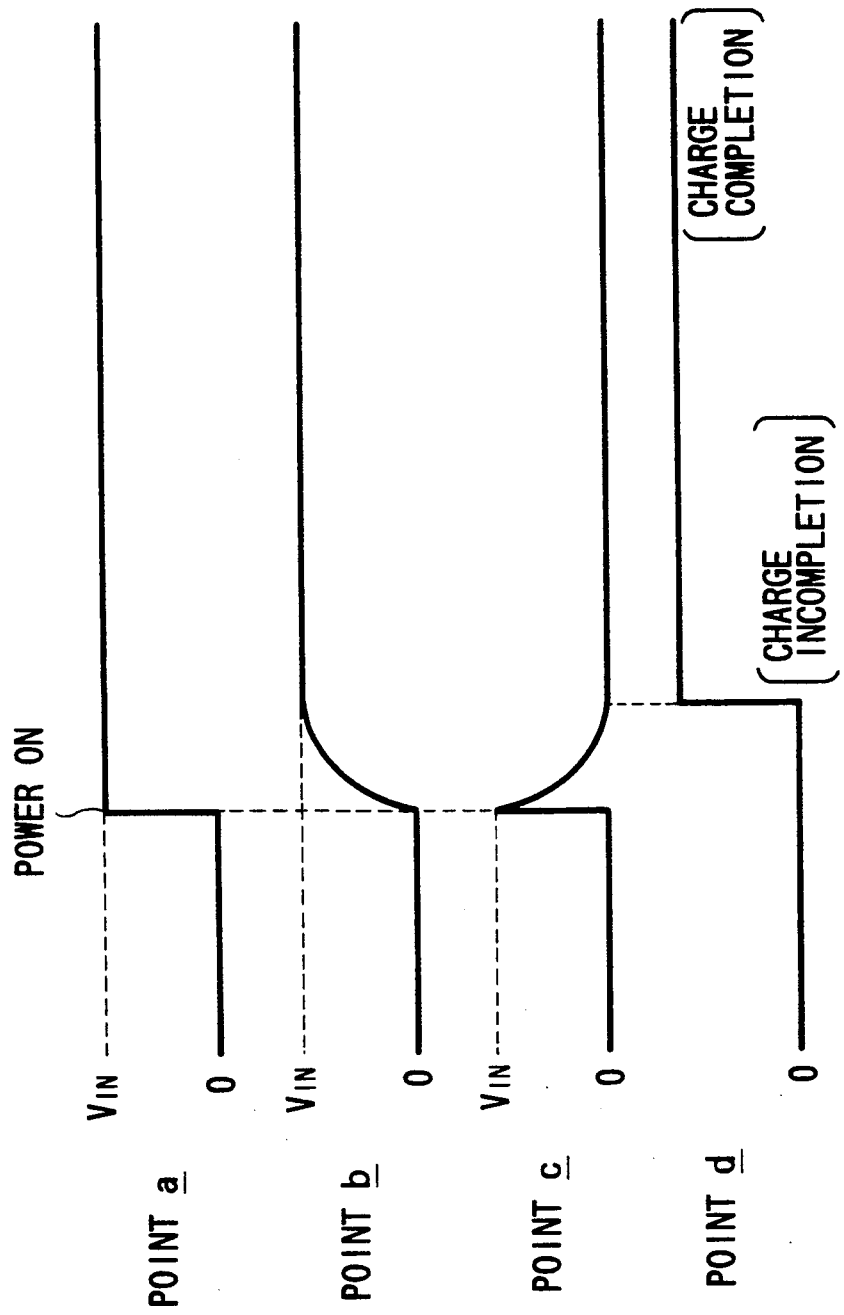
FIG. 3 is a timing chart showing operating waveforms at the respective portions in the embodiment of the present invention.
Figure 4:
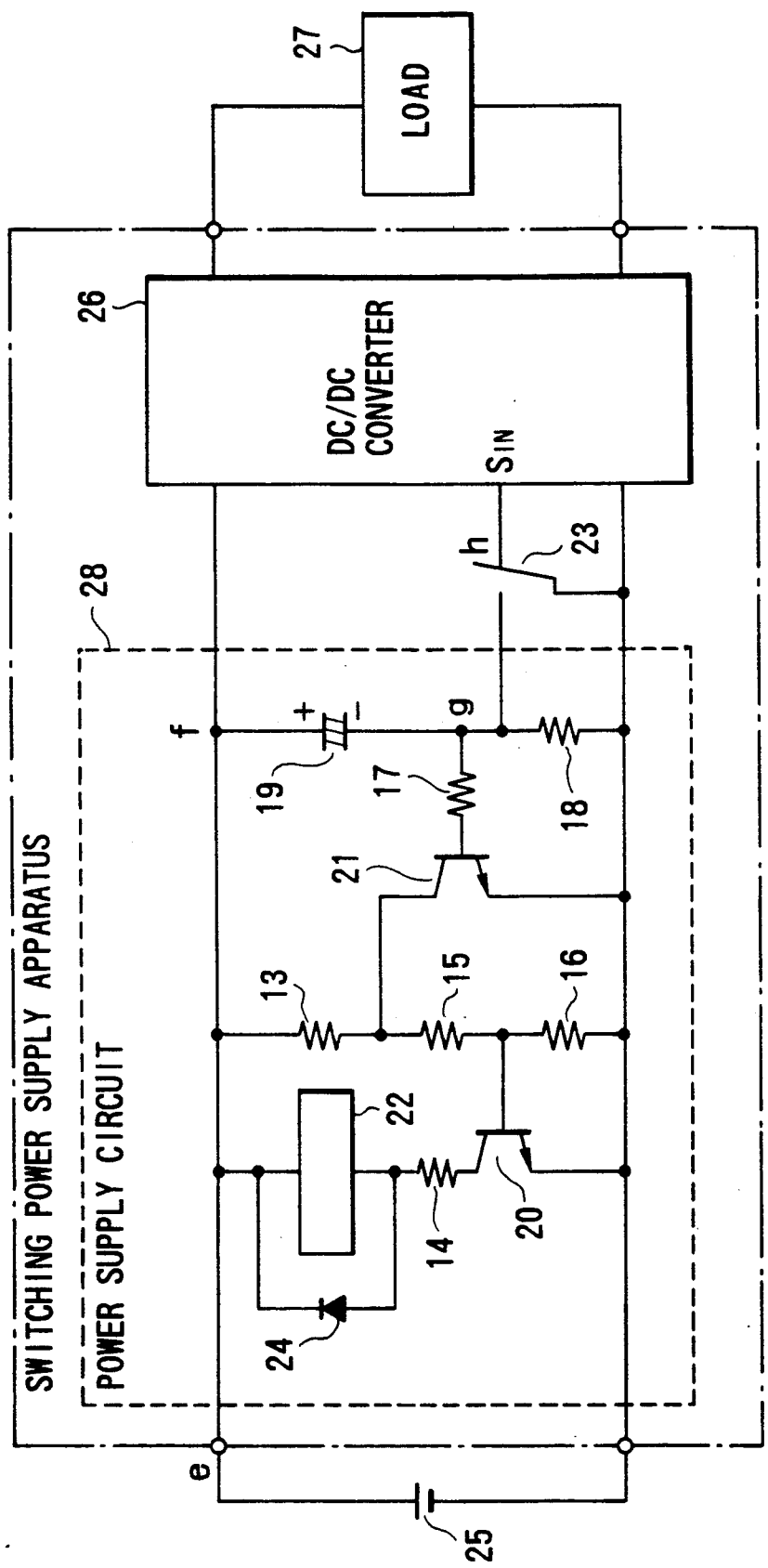
FIG. 4 is a circuit diagram showing a detailed arrangement of a conventional apparatus.

An operation of the power supply circuit will be described below with reference to FIGS. 2 and 3. When a stepped DC voltage is applied to an input terminal (point a) of the switching power supply apparatus, a voltage waveform obtained by differentiating the input voltage appears at a point c in FIG. 2, as shown in FIG. 3. With this operation, a base bias is applied to the npn transistor 4 through the resistor 2 to turn it on, and the potential of the gate terminal of the MOSFET 5 is decreased to be a threshold level or less. Therefore, the MOSFET 5 is in OFF state. At this time, the photocoupler is turned on by the npn transistor 4 to hold a charge completion signal terminal $S_{IN}$ of the DC/DC converter 11 at a low level and transmit a signal representing that charging of the capacitor 9 is not completed.

The potential at the point c in FIG. 2 reaches its peak when the input voltage is applied, and is gradually decreased in inverse proportion to the degree of charging of the capacitor 9. When the potential at the point c becomes lower than a base-emitter voltage $V_{BE}$ of the npn transistor 4, the npn transistor 4 is turned off, and power is supplied to the Zener diode 6 and the MOSFET 5 through the resistor 1. As a result, the MOSFET 5 is driven by a voltage determined by the Zener diode 6. At this time, charging of the capacitor 9 is substantially completed. When the npn transistor 4 is turned off, the photocoupler is also turned off to shift the charge completion signal terminal $S_{IN}$ of the DC/DC converter 11 to high level as indicated by a point d and transmit a signal representing completion of charging of the capacitor 9. FIG. 3 shows waveforms at the respective portions in this case.

According to the present invention, the power supply circuit having the above circuit arrangement can respond to even a considerably different input voltage condition. That is, the power supply circuit can respond to a change in input voltage condition by adjusting the constants of the resistors 1 to 3. The power supply circuit can respond to an input voltage variation in a wide range by only supply power required to drive the MOSFET 5 through the resistor 1. In comparison with a power supply circuit using a relay, therefore, the power supply circuit of the present invention has a wide operation range and hence is very versatile.

As has been described above, the present invention can be applied to a wide range of input voltages as compared with the prior art.

What is claimed is:

1. A switching power supply apparatus comprising:
   a DC/DC converter, having a signal input terminal for receiving a standby completion signal, for convertinq an input voltaqe from a DC power supply and applying the converted voltage to a load;
   an input filter capacitor connected to between DC power supply input terminals of said DC/DC converter;
   a first series circuit constituted by a first resistor and a Zener diode which are connected between positive and negative electrodes of an input power supply;
   a second series circuit connected in parallel with said Zener diode and constituted by a photocoupler for supplying an output to the signal input terminal of said DC/DC converter and a transistor for receiving a differential output from said input filter capacitor as a base input; and
   a field effect transistor having an input electrode connected to a node between said DC power supply and said first series circuit, an output electrode connected to a negative input terminal of said DC/DC converter, and a control electrode connected to a node between said first resistor of said first series circuit and said Zener diode.

2. An apparatus according to claim 1, further comprising a second resistor for controlling a base bias to be applied to said transistor by using the differential output from said input filter capacitor.

3. An apparatus according to claim 1, further comprising a third resistor connected between the input and output electrodes of said field effect transistor.

4. An apparatus according to claim 1, wherein the standby completion signal is a charge completion signal associated with said input filter capacitor.

5. An apparatus according to claim 1, wherein said photocoupler has a light-emitting element connected in series with said transistor, and a light-receiving element connected between the input signal terminal of said DC/DC converter and the negative input terminal of said DC power supply.

6. An apparatus according to claim 1, wherein said input filter capacitor, said first resistor, said Zener diode, said photocoupler, said transistor, and said field effect transistor constitute a power supply circuit.

* * * * *